(12) United States Patent
Agarwal et al.

(10) Patent No.: US 11,494,464 B1
(45) Date of Patent: Nov. 8, 2022

(54) ANALOG VECTOR-MATRIX MULTIPLICATION BY CAPACITIVE ELEMENTS WITH RESISTIVE STATE STORAGE

(71) Applicant: National Technology & Engineering Solutions of Sandia, LLC, Albuquerque, NM (US)

(72) Inventors: Sapan Agarwal, Cambridge, MA (US); Matthew Marinella, Gilbert, AZ (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 155 days.

(21) Appl. No.: 17/031,001

(22) Filed: Sep. 24, 2020

(51) Int. Cl.
*G06F 17/16* (2006.01)
(52) U.S. Cl.
CPC .................................. *G06F 17/16* (2013.01)
(58) Field of Classification Search
CPC ....................................................... G06F 17/16
USPC ......................................................... 708/823
See application file for complete search history.

(56) References Cited

U.S. PATENT DOCUMENTS

| | | | | |
|---|---|---|---|---|
| 10,249,356 | B2 * | 4/2019 | Ge | G11C 11/34 |
| 10,776,684 | B1 * | 9/2020 | Agarwal | G06N 3/0635 |
| 2020/0218967 | A1 * | 7/2020 | Strachan | G06N 3/08 |

OTHER PUBLICATIONS

Bavandpour, et al., "Efficient Mixed-Signal Neurocomputing via Successive Integration and Rescaling", In IEEE Transactions on Very Large Scale Integration (VLSI) Systems, vol. 28, No. 3, Mar. 2020, pp. 823-827.
Valavi, et al., "A Mixed Signal Binarized Convolutional-Neural-Network Accelerator Integrating Dense Weight Storage and Multiplication for Reduced Data Movement", In IEEE 2018 Symposium on VLSI Circuits Digest of Technical Papers, 2018, pp. 141-142.

* cited by examiner

*Primary Examiner* — Tan V Mai
(74) *Attorney, Agent, or Firm* — Michael J. Medley, Esq.; Calfee, Halter & Griswold LLP

(57) ABSTRACT

An array circuit includes a plurality of vector-matrix multiplication (VMM) elements arranged in rows and columns. The VMM elements are configured to collectively perform multiplication of an input vector by a programmed input matrix to generate a plurality of output values that are representative of a result matrix that is the result of multiplication of the input vector and the input matrix. The VMM elements store states of the input matrix. Input voltages to the array are representative of elements of the input vector. A VMM element draws charge from a column read line based upon charging of a capacitor in the VMM. An integrator circuit connected to the column read line outputs a voltage that is indicative of a total charge drawn from the column read line by elements connected to the read line, which voltage is further indicative of an element of a result matrix.

20 Claims, 11 Drawing Sheets

| $V_{R1A}$ | $V_{R1B}$ | VECTOR ELEMENT | R1 | R2 | MATRIX ELEMENT | OPERATION | $V_C$ |
|---|---|---|---|---|---|---|---|
| 0 | 0 | 0 | LOW | HIGH | 1 | 0x1=0 | 0 |
| 0 | 0 | 0 | HIGH | LOW | 0 | 0x0=0 | 0 |
| $V_{READ}$ | 0 | 1 | LOW | HIGH | 1 | 1x1=1 | $V_{READ}$ |
| $V_{READ}$ | 0 | 1 | HIGH | LOW | 0 | 1x0=0 | 0 |
| $-V_{READ}$ | 0 | -1 | LOW | HIGH | 1 | -1x1=-1 | $-V_{READ}$ |
| $-V_{READ}$ | 0 | -1 | HIGH | LOW | 0 | -1x0=0 | 0 |

| $V_{R1A}$ | $V_{R1B}$ | VECTOR ELEMENT | R1 | R2 | MATRIX ELEMENT | OPERATION | $V_C$ |
|---|---|---|---|---|---|---|---|
| $V_{READ}$ | $-V_{READ}$ | 1 | LOW | HIGH | 1 | 1x1=1 | $V_{READ}$ |
| $V_{READ}$ | $-V_{READ}$ | 1 | HIGH | LOW | -1 | 1x-1=-1 | $-V_{READ}$ |
| $-V_{READ}$ | $V_{READ}$ | -1 | LOW | HIGH | 1 | -1x1=-1 | $-V_{READ}$ |
| $-V_{READ}$ | $V_{READ}$ | -1 | HIGH | LOW | -1 | -1x-1=1 | $V_{READ}$ |

| $V_{R1A}$ | VECTOR ELEMENT | R3 | MATRIX ELEMENT | OPERATION | $V_{C2}$ |
|---|---|---|---|---|---|
| 0 | 0 | LOW | 1 | 0x1=0 | 0 |
| 0 | 0 | HIGH | 0 | 0x0=0 | 0 |
| $V_{READ}$ | 1 | LOW | 1 | 1x1=1 | $V_{READ}$ |
| $V_{READ}$ | 1 | HIGH | 0 | 1x0=0 | 0 |
| $-V_{READ}$ | -1 | LOW | 1 | -1x1=-1 | $-V_{READ}$ |
| $-V_{READ}$ | -1 | HIGH | 0 | -1x0=0 | 0 |

ANALOG VECTOR-MATRIX MULTIPLICATION BY CAPACITIVE ELEMENTS WITH RESISTIVE STATE STORAGE

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Analog vector-matrix multiplication (VMM) finds applications in various areas of computing technology, including artificial neural networks. Analog VMM has previously been performed using non-volatile memory elements. However, the accuracy of multiplication using these elements is limited by the variability of on- and off-state current across non-volatile memory devices. Capacitive memory elements have been considered, but currently require large static random access memory (SRAM) circuits to store a system state. These SRAM circuits require substantial additional power, limiting the performance and utility of these devices.

SUMMARY

The following is a brief summary of subject matter that is described in greater detail herein. This summary is not intended to be limiting as to the scope of the claims.

Technologies pertaining to an array circuit for computation of vector-matrix multiplication are described herein. An array circuit includes a plurality of rows and a plurality of columns. The array circuit can be referenced by row-column pairs, wherein the array circuit includes a VMM element for each row-column pair. The VMM elements are configured to collectively perform multiplication of an input vector by a programmed input matrix to generate a plurality of analog output values that are representative of a matrix result of the multiplication. Rows and columns of the array can be selectively addressed by way of row and column input/output lines.

In an exemplary embodiment, each of the VMM elements comprises a capacitor and a pair of non-volatile memory (NVM) elements. The NVM elements are non-volatile in that a state stored by an NVM element is retained even when power is not applied to the NVM element. The NVM elements are programmable in that the respective states of the NVM elements can be modified when write conditions are satisfied but reliably read without changing the state when the write conditions are not met. The NVM elements can be connected to the capacitor at a first node. Opposite terminals of the NVM elements and the capacitor can further be connected to respective input/output lines. By way of example, each of the NVM elements of a VMM element can be connected to a respective row input line, whereas the capacitor of the VMM element can be connected to a column output line.

A voltage can be applied to one of the row input lines of a VMM element. The applied voltage can be indicative of a value of an element of an input vector that is desirably multiplied by an input matrix. States of the NVM elements of the VMM elements can be indicative of values of elements of the input matrix. Thus, responsive to the voltage being applied to one of the row input lines, and based upon states of the NVM elements, a voltage is developed across the capacitor, wherein the capacitor voltage is indicative of a product of an element of the input vector and an element of the input matrix. Application of the voltage to the capacitor causes the capacitor to charge, and a charge that is proportional to the voltage applied to the capacitor is drawn from the column output line. An integrator circuit can be connected to the column output line such that the integrator outputs a voltage that is indicative of a sum total charge drawn from the column output line (i.e., from the VMM elements connected to the column output line). Accordingly, the output of the integrator is a voltage indicative of a sum of products of input vector elements (represented by voltages input to the VMM elements) and input matrix elements (represented by stored states of the VMM elements) that is equal to an element of a result matrix, which matrix is the result of multiplication of the input vector by the input matrix stored in the states of the VMM elements.

Each of the VMM elements can further comprise a transistor, wherein the transistor can be used to control writing of a state to the NVM elements of its VMM element. The drain and source of the transistor can be connected in parallel with the capacitor of its VMM element. In an exemplary embodiment, a gate of the transistor of each VMM element is connected to a column write line corresponding to the column in which the VMM element lies. When a voltage is applied to the column write line, a conductive path is formed between the drain and source of the transistor, effectively short-circuiting the capacitor. A write voltage can then be applied to a row input line that is connected to an NVM element the state of which is desirably written, wherein application of the write voltage causes a state of the NVM element to change.

Technologies described herein present various advantages over other vector-matrix multiplication circuits. For example, a state of a matrix to be multiplied can be durably stored in an array in a non-volatile manner by way of the NVM elements. Furthermore, such storage requires lower power and energy than SRAM state storage. Still further, the arrays described herein are not as susceptible to output noise caused by non-uniform resistance states of NVM elements in the array, since the multiplication outputs of the array are based upon charge stored in capacitors rather than the resistance states of the NVM elements directly.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 3 is an exemplary state table for the VMM element of FIG. 2.

FIG. 6 is an exemplary state table for the VMM element of FIG. 5.

DETAILED DESCRIPTION

Figure 1:
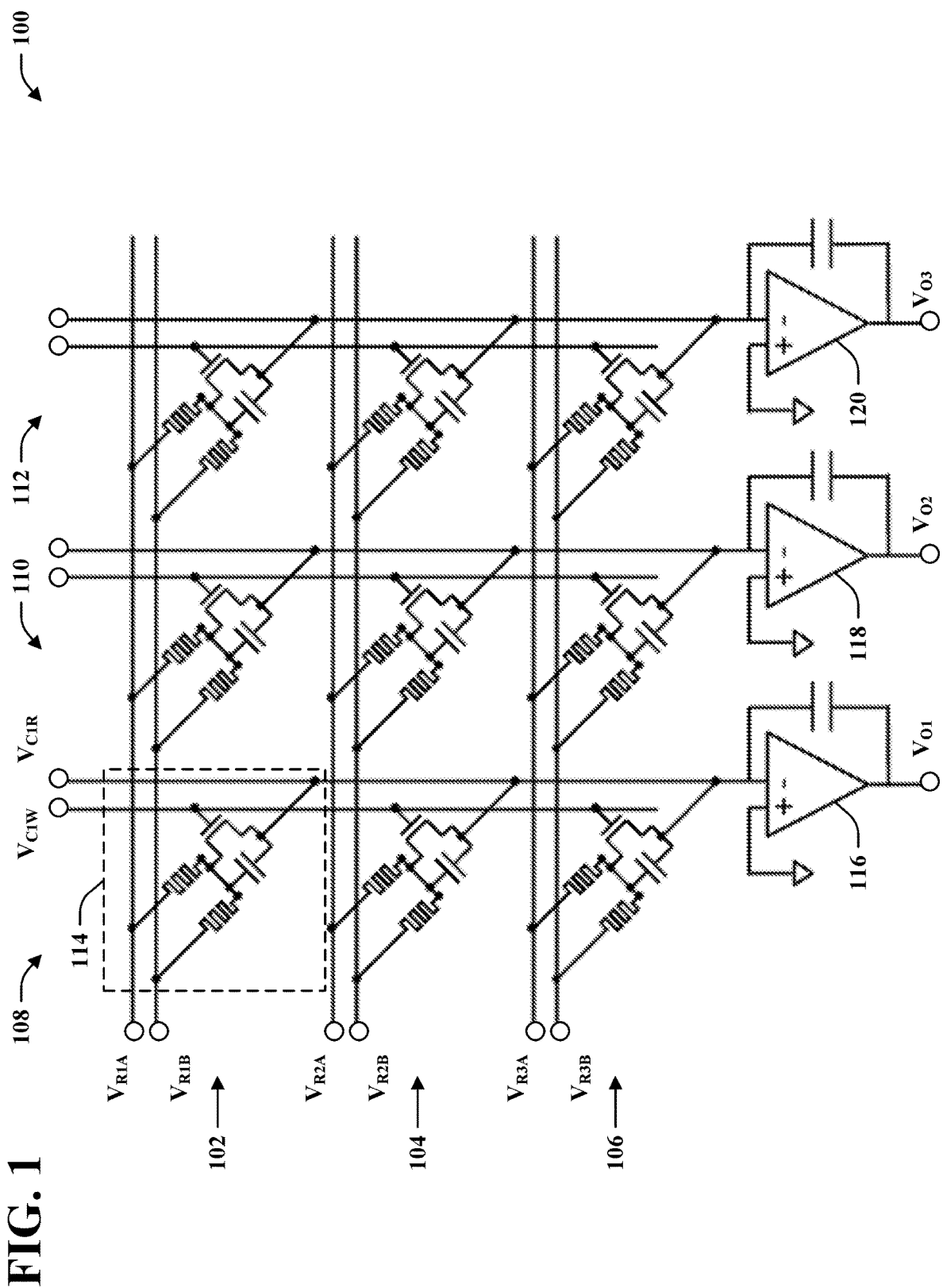
FIG. 1 is a schematic of an exemplary array circuit for vector-matrix multiplication.

Various technologies pertaining to circuits for performing vector-matrix multiplication are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary array 100 that is configured to perform vector-matrix multiplication (VMM) is illustrated. The array 100 has a plurality of rows 102-106 and columns 108-112. The array 100 comprises a plurality of VMM elements (e.g., an element 114). The exemplary array 100 is a 3×3 array, however, it is to be understood that the technologies described herein are not so-limited. For example, the array 100 can be a 50×50 array, a 100×100 array, a 1024×1024 array, or substantially any other size. Further, the array 100 need not be square.

The array 100 is addressable by row and column terminals. Each of the rows 102-106 is addressable by two row terminals, e.g., $V_{R1A}$ and $V_{R1B}$ for the first row 102. Similarly, the second row 104 is addressable by terminals $V_{R2A}$, $V_{R2B}$, and the third row 106 is addressable by terminals $V_{R3A}$, $V_{R3B}$. Each of the columns 108-112 is addressable by a write terminal, e.g., $V_{C1W}$ for the first column 108, and a read terminal, e.g., $V_{C1R}$ for the first column 108. The array 100 further comprises a plurality of integrator circuits 116-120, wherein each of the integrators 116-120 is connected to a respective column read terminal. For example, the first integrator 116 is connected to the first column read terminal $V_{C1R}$ by way of an input terminal of the integrator 116. By way of example, and not limitation, the integrator circuits 116-120 can be op-amp integrator circuits.

The array 100 is configured to perform vector-matrix multiplication by way of input to the row terminals and based upon states stored in the VMM elements of the array 100. In exemplary embodiments, the array 100 can be configured to perform vector-matrix multiplication to generate an analog output at output terminals $V_{O1}$, $V_{O2}$, $V_{O3}$ of the integrator circuits 116-120, respectively. In a non-limiting example, and as will be described in greater detail below, the array 100 can be configured to multiply a 1×3 input vector $X=[x_{11}\ x_{12}\ x_{13}]$ by a 3×3 input matrix Y=

$$\begin{bmatrix} y_{11} & y_{12} & y_{13} \\ y_{21} & y_{22} & y_{23} \\ y_{31} & y_{32} & y_{33} \end{bmatrix},$$

wherein each of the integrator circuit outputs $V_{O1}$, $V_{O2}$, $V_{O3}$ is representative of a value of a respective element of matrix A=X·Y, where $A=[a_{11}\ a_{12}\ a_{13}]$. It is to be appreciated that each of $a_{11}$, $a_{12}$, $a_{13}$ is therefore a sum of products of elements from X and Y. For instance, the element $a_{11}$ can be defined by the equation:

$$a_{11}=x_{11}y_{11}+x_{12}y_{21}+x_{13}y_{31}$$

The multiplication of the vector X by the matrix Y can be accomplished by way of the array 100 by programming values of the matrix Y into states of the VMM elements of the array and applying "read" voltages corresponding to the element values of X to a set of the row terminals (e.g., $V_{R1A}$, $V_{R2A}$, $V_{R3A}$).

Figure 2:
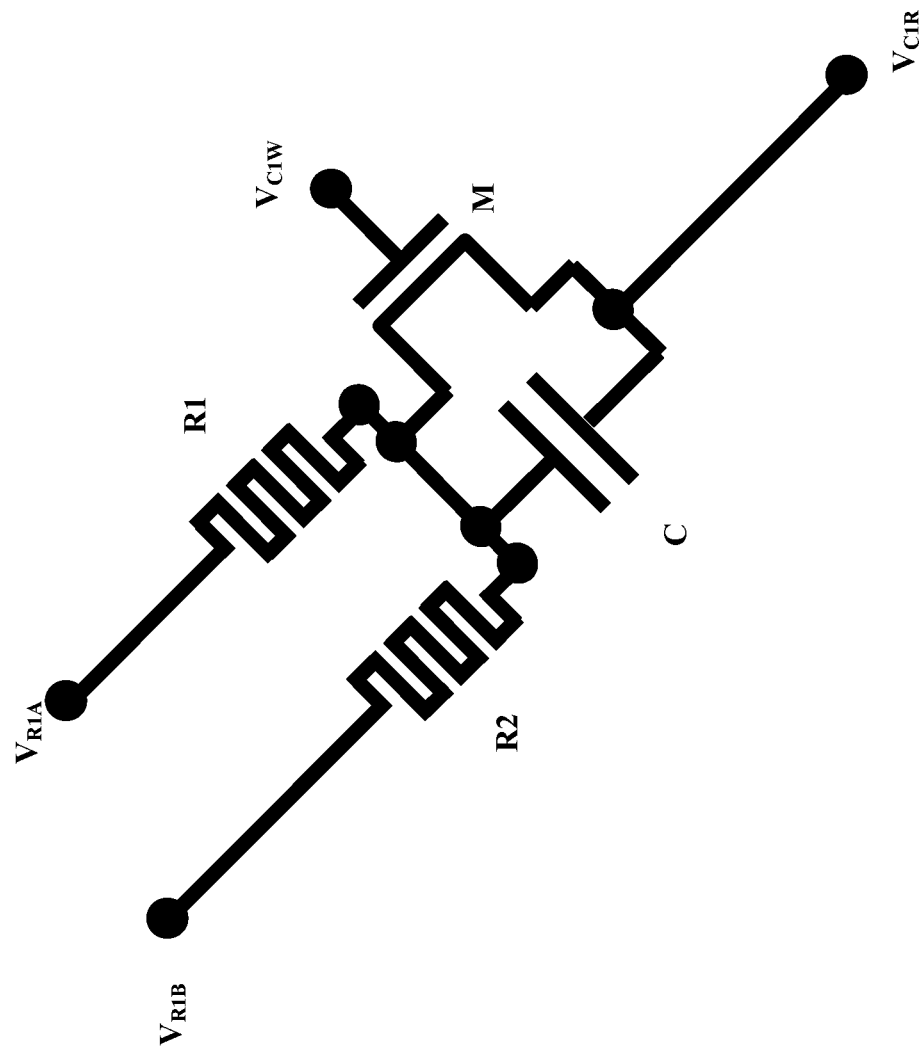
FIG. 2 is a schematic of an exemplary VMM element.

Details of operations of the array 100 are now described with reference to FIG. 2, which depicts the VMM element 114. The VMM element 114 comprises a first NVM element R1, a second NVM element R2, a capacitor C, and a transistor M. The first NVM element R1 is connected to a first row input terminal $V_{R1A}$ and a first terminal of the capacitor C. The second NVM element R2 is connected to a second row input terminal $V_{R1B}$ and the same first terminal of the capacitor C as the first NVM element R1. A second terminal of the capacitor is connected to a column read terminal $V_{C1R}$. Drain and source terminals of the transistor M are connected to the first and second terminals of the capacitor C, respectively (or vice versa). A gate of the transistor M is connected to a column write terminal $V_{C1W}$.

The NVM elements R1, R2 can be any of various types of non-volatile memory devices that have a programmable resistance state that is maintained when power is lost. By way of example, and not limitation, the NVM elements R1, R2 can be resistive random access memory (ReRAM) devices, phase-change memory, programmable-metallization cell (PMC) devices (also known as conductive-bridging RAM or CB-RAM), spin-transfer torque magnetic RAM (STT-MRAM), or the like. It is to be understood that in at least some embodiments, additional supporting circuitry can be incorporated into a VMM element shown in order to facilitate writing of a state to an NVM element, as will be appreciated by those of skill in the art based upon the present disclosure.

To "write" a state to the VMM element 114, a voltage is applied to a gate terminal of the transistor M by way of the first column write line $V_{C1W}$. The applied gate voltage places the transistor M in a conducting state between its source and drain terminals such that the transistor functions substantially as a short circuit between its source and drain terminals. To write a state to the first NVM element R1, 0V is applied to $V_{R1B}$ and a write voltage $V_{WRITE}$ is applied to $V_{R1A}$. Current flowing from $V_{R1A}$ to $V_{C1R}$ by way of the transistor M causes a resistance of the element R1 to change. In exemplary embodiments, the change of the value of the resistance of R1 is a function of a value of $V_{WRITE}$ and/or a duration over which $V_{WRITE}$ is applied to $V_{R1A}$. The NVM element R2 can similarly be written by setting $V_{R1A}$ to 0V and applying a write voltage (e.g., $V_{WRITE}$) to $V_{R1B}$. From the foregoing, it will be appreciated that states of the VMM elements in a single column 108-112 may be written simultaneously by application of a voltage to the corresponding column write terminal (e.g., $V_{CW1}$ with respect to the first column 108) and desired voltages being applied to the row voltage terminals $V_{R1A/B}$, $V_{R2A/B}$, and $V_{R3A/B}$ according to the states desirably written to the VMM elements of the column. In various embodiments, the write voltage $V_{WRITE}$ is several times greater than a voltage $V_{READ}$ used to represent a value of an element of an input vector to the array 100 (e.g., two times greater, three times greater, or five times greater).

During "read," or multiplication, operation of the array 100, the transistor M of the VMM element 114 is kept in a non-conducting state such that the transistor M functions as an open circuit between its drain and source terminals. The voltage $V_{C1R}$ can be kept at a reference voltage of 0V. The voltages $V_{R1A}$ and $V_{R1B}$ can be initialized to 0V prior to the read operation, and the capacitor C discharged. To perform a read operation, the voltages $V_{R1A}$ and $V_{R1B}$ are set in order to form a voltage divider across the NVM elements R1 and R2. When the VMM element is in an operative state (i.e., ready to read), the NVM elements R1 and R2 can be configured such that one of the elements, e.g., R1, is in a high resistance state (e.g., on the order of 100 kΩ, 1 MΩ, 10 MΩ, or greater) whereas the other of the elements, e.g., R2, is in a low resistance state (e.g., 1% or less of R1, 0.1% or less of R1, or 0.01% or less of R1). Accordingly, under steady-state DC conditions, the voltage across the capacitor is approximately equal to the voltage applied to the NVM element in the low resistance state. In other words, if R1 is high and R2 is low, the voltage across the capacitor C will be approximately equal to $V_{R1B}$. Similarly, if R1 is low and R2 is high, the voltage across the capacitor C will be approximately equal to $V_{R1A}$. If both R1 and R2 are high, the VMM element 114 is effectively disabled. For example, a read time of the array 100 (e.g., a time between application of read voltages at the row terminals $V_{R1A}$, $V_{R1B}$, etc., and readout of results from the integrator circuits 116-120) can be sufficiently short that the capacitor C does not have time to draw enough charge to affect a readout value of the integrator circuit 116 (as will be described in greater detail below).

Either of $V_{R1A}$ or $V_{R1B}$ can be used as a vector element input value to the VMM element 114, and a joint resistance state of R1/R2 can be used to store a state value of the VMM element 114 that is representative of a matrix element value. For example, and referring now to FIG. 3, a state table 300 that represents biasing conditions for the terminals $V_{R1A}$, $V_{R1B}$, and states of R1, R2 for various vector and matrix element values is shown. The state table 300 assumes that $V_{R1A}$ is the input line for values of elements of the input vector X, however, it is to be understood that $V_{R1B}$ can be used as the input line for values of elements of X. In such embodiments, the high and low states depicted in the state table 300 of FIG. 3 are reversed. In exemplary embodiments, a voltage $V_{READ}$ is taken to be a binary 1, whereas a voltage of 0V can be taken to represent a binary 0. The state table 300 assumes that the state R1=high, R2=low represents a binary 0, with R1=low, R2=high represents a binary 1. As the state table 300 indicates, when either the input value of $V_{R1A}$ or the state represented by the resistances is 0, the product of the two is 0 and the capacitor C is charged to a voltage across the capacitor, $V_C$, of 0. When the input value of $V_{R1A}$ and the resistance states R1, R2 represent a binary 1, the product of the two is 1 and the capacitor C is charged to a voltage of $V_{READ}$. When the input value of $V_{R1A}$ is representative of −1 (e.g., a voltage of −$V_{READ}$) and the resistance states R1, R2 are representative of binary 1, the product is −1 and the capacitor voltage $V_C$ is −$V_{READ}$. Accordingly, the output voltage of the VMM element 114 $V_C$ across the capacitor is indicative of a result of multiplication between an element of the input vector X and an element of the stored matrix Y.

While the state table 300 indicates binary values of the input vector elements, multiples of the voltage $V_{READ}$ can be input at $V_{R1A}$ to represent non-binary values of elements of the input vector X. Non-binary values of elements of the matrix Y can be represented using circuit architectures that are described in greater detail below.

When the capacitor C charges, the capacitor draws a charge q=$C^*V_C$ from the read column at terminal $V_{C1R}$ to balance a charge accumulated at the opposite terminal of the capacitor. Thus, referring once again to FIG. 1, the charge q is drawn from a terminal connected to an input line of the integrator 116. The charge q drawn by the VMM element 114 is a function of the voltage across the capacitor, $V_C$, which in turn is indicative of a product between an element of the input vector X (e.g., represented by voltage $V_{R1A}$) and an element of the matrix Y. The integrator 116 is configured to output a voltage value $V_{O1}$ that is proportional to the sum total charge q drawn by all of the VMM elements connected to its input, $V_{C1R}$ (i.e., the VMM elements in the first column 108). Thus, the output $V_{O1}$ of the integrator 116 is indicative of a sum of element-wise products of the vector X with the first column of the matrix Y. Stated differently, the output $V_{O1}$ is a voltage that is proportional to the element $a_{11}$ of matrix A. Accordingly, and as noted above, the array 100 can be configured to perform multiplication of a vector X by a matrix Y such that the outputs $V_{O1}$, $V_{O2}$, $V_{O3}$ of the array 100 are indicative of the values of $a_{11}$, $a_{12}$, $a_{13}$, respectively. In exemplary embodiments, terminals $V_{R1A}$, $V_{R2A}$, and $V_{R3A}$ serve as input lines for values $x_{11}$, $x_{12}$, $x_{13}$, respectively, and the resistance states of the NVM elements in the VMM elements serve to store values of the elements of the matrix Y.

Figure 4:
FIG. 4 is another exemplary state table for the VMM element of FIG. 2.

In some embodiments, the array 100 can be configured such that binary states of the VMM elements and inputs to the VMM elements are valued −1 or +1 rather than 0 and +1. By way of example, and referring now to FIG. 4, another exemplary state table 400 is shown, wherein inputs to the VMM elements and the states stored in such elements represent positive and negative values, +1 and −1. In the state table 400, $V_{R1A}$ is again taken to represent the value of an element of the input vector X, where −$V_{READ}$ represents input value −1 and $V_{READ}$ represents input value 1. The state R1=high R2=low is used to represent a matrix element −1, whereas the state R1=low R2=high is used to represent a matrix element 1. Accordingly, when one of the value of $V_{R1A}$ or the state of the NVM elements R1, R2 is negative, the outputs $V_C$ takes negative value $-V_{READ}$. If the value of $V_{R1A}$ and the state of the NVM elements R1, R2 are both positive or both negative then $V_C$ takes the positive value $V_{READ}$.

Figure 5:
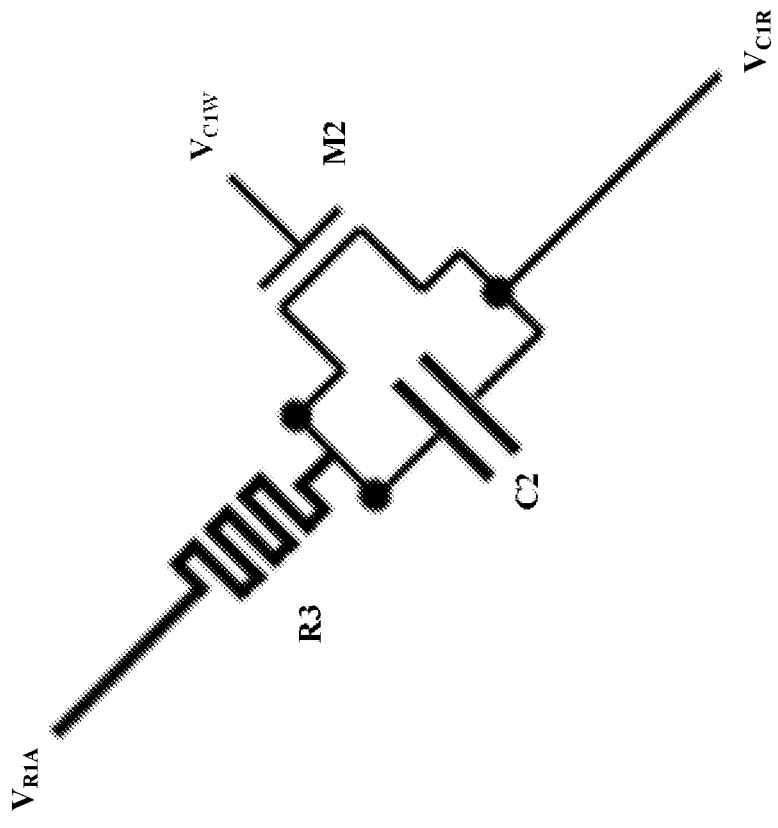
FIG. 5 is a schematic of another exemplary VMM element.

In other exemplary embodiments, the VMM elements of the array 100 can have only single NVM elements. By way of example, and referring now to FIG. 5, another exemplary VMM element 500 is shown that can be used in place of VMM element 114. The VMM element comprises an NVM element R3, a capacitor C3, and a transistor M2. A first terminal of the NVM element R3 can be connected to the first row read element $V_{R1A}$. A second terminal of the NVM element R3 is connected to a first terminal of the capacitor C2 and a drain or source terminal of the transistor M2. A second terminal of the capacitor C2 is connected to the other of the source or the drain of the transistor M2, and can be connected to the column read terminal $V_{C1R}$. Similarly to the VMM element 114, the gate terminal of the transistor M2 can be connected to the column write terminal $V_{C1W}$. It is to be understood that in embodiments wherein the array 100 uses VMM elements each having a single NVM element, the second row read terminal of each row (e.g., $V_{R1B}$) is not needed.

With reference now to FIG. 6, an exemplary state table 600 for the VMM element 500 is shown. The input voltage $V_{R1A}$ can take values of 0, $V_{READ}$, $-V_{READ}$ corresponding to input values 0, 1, −1, respectively. The NVM element R3 can be in a low-resistance state corresponding to a value of 1 or a high-resistance state corresponding to a value of 0. When either the input voltage $V_{R1A}$ is 0 or the resistance of R3 is high, the output of the VMM element, $V_{C2}$ across the capacitor C2, is zero. When the resistance state of R3 is low, the output of the VMM element is substantially equal to the input voltage at $V_{R1A}$.

In the VMM element 500, the capacitor C2 will charge whether the NVM element R3 is in the high resistance state or the low resistance state. Thus, a pulse duration for which an input voltage is applied at $V_{R1A}$ can be controlled such that during the pulse duration, the capacitor C2 charges to a voltage substantially equal to $V_{R1A}$ when the NVM element R3 has a low resistance state, whereas the capacitor C2 does not substantially charge during the pulse duration (e.g., such that $V_{C2}$ is less than or equal to 10% of $V_{R1A}$, less than or equal to 5% of $V_{R1A}$, or less than or equal to 1% of $V_{R1A}$) when the NVM element R3 has a high resistance state.

In still further exemplary embodiments, the array 100 can be configured to perform multiplication with multi-bit or analog inputs and multi-bit matrix state values. As noted above, multi-bit inputs or analog inputs at the row read terminals $V_{R1A}$, $V_{R1B}$, $V_{R2A}$, $V_{R2B}$, $V_{R3A}$, $V_{R3B}$ can be implemented by scaling the voltage inputs at those terminals. Accordingly, substantially any vector element value can be represented by adjusting the input voltage at the appropriate row read terminal or terminals. In other embodiments, a same $V_{READ}$ can be applied to a VMM element in a pulsed fashion to represent multiple bit levels. By way of example, a first voltage pulse having a value $V_{READ}$ can be applied to the row read terminal $V_{R1A}$. A corresponding charge drawn from the column read line $V_{C1R}$ can be accumulated by the integrator 116. The voltage $V_{R1A}$ can be reset to zero and the capacitor C of the VMM element 114 discharged to 0V. Subsequently, a second voltage pulse having value $V_{READ}$ can be applied to the row read terminal $V_{R1A}$. A charge corresponding to the second pulse is further accumulated by the integrator 116. Thus, subsequent pulses can add to a value stored by the integrator 116, and multiple pulses can be used to represent a greater vector element input value without requiring a different voltage value to be applied to the row read terminal $V_{R1A}$. A number of pulses applied can correspond to a number of bit positions desirably represented. By way of example, 8 pulses can be used to represent 3-bit values, 16 pulses can be used to represent 4-bit values, etc. In such embodiments, values stored by the integrators 116-120 can be read out at the output terminals $V_{O1}$, $V_{O2}$, $V_{O3}$ and then reset between a group of pulses representing first input values and a second group of pulses representing second input values.

Figure 7:
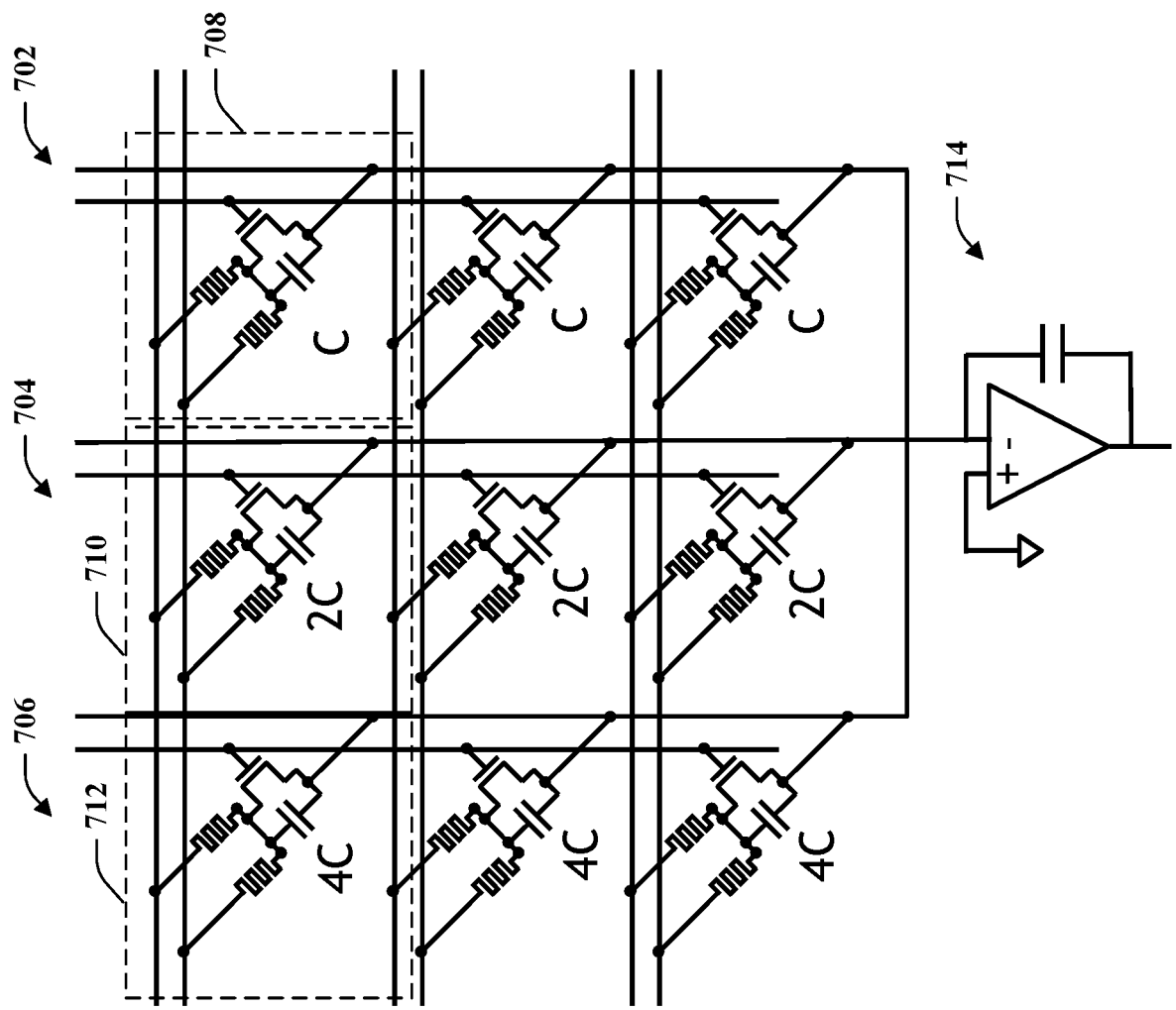
FIG. 7 is a schematic of another exemplary array circuit for vector-matrix multiplication.

Multi-bit matrix element values can be stored in states of VMM elements of an array by various means. In one exemplary embodiment, multi-bit matrix element values are stored in states of VMM elements by scaling capacitances of VMM elements depending upon their positions in the array. For example, and referring now to FIG. 7, an exemplary array 700 is shown wherein VMM elements in a first column 702 have capacitors with capacitance C, VMM elements in a second column 704 have capacitors with capacitance 2C, VMM elements in a third column 706 have capacitors with capacitance 4C, etc. For instance, a fourth column (not shown) would have VMM elements with capacitors of capacitance 8C. The first column 702 represents a least-significant-bit position of a multi-bit matrix element value. The second column 704 represents a next least-significant-bit position, whereas the third column 706 represents a next least-significant-bit position after that represented by the second column 704. States of VMM elements in a same row of the array 700 are representative of a multi-bit value of a same element of a matrix. For instance, if a first element of a matrix represented by the VMM elements of the array 700 is 5, represented by a binary value 101, the first element can be represented by a state 1 at a first VMM element 708 in the first column 702, a state 0 at a second VMM element 710 in the second column 704, and a state 1 at a third VMM element 712 in the third column 706. Since the charge at each terminal of a capacitor is proportional to its capacitance, a voltage input to a VMM element in the third column 706 causes the VMM element to draw four times as much charge as drawn by a VMM element in the first column 702 responsive to the same voltage input. Thus, scaling the capacitance of each VMM element by a corresponding bit position as in the array 700 scales a charge drawn by the VMM element according to a significance of that bit position.

The 3×3 array 700 can represent a 3×1 matrix, wherein each row of the array 700 is representative of a respective element of the matrix. The array 700 can be configured to multiply a 1×3 vector by the 3×1 matrix to yield a 1×1 result matrix. Since each of the VMM elements of the array 700 is representative of an element in a same column of the 3×1 state matrix represented by the array, the outputs of the VMM elements (e.g., the column-connected terminals of the capacitors of the VMM elements) are all connected to a same integrator 714. In other words, the products of the states of the VMM elements and the input states represented by the input row voltages to the array 700 all contribute to a same element of the result matrix.

Figure 8:
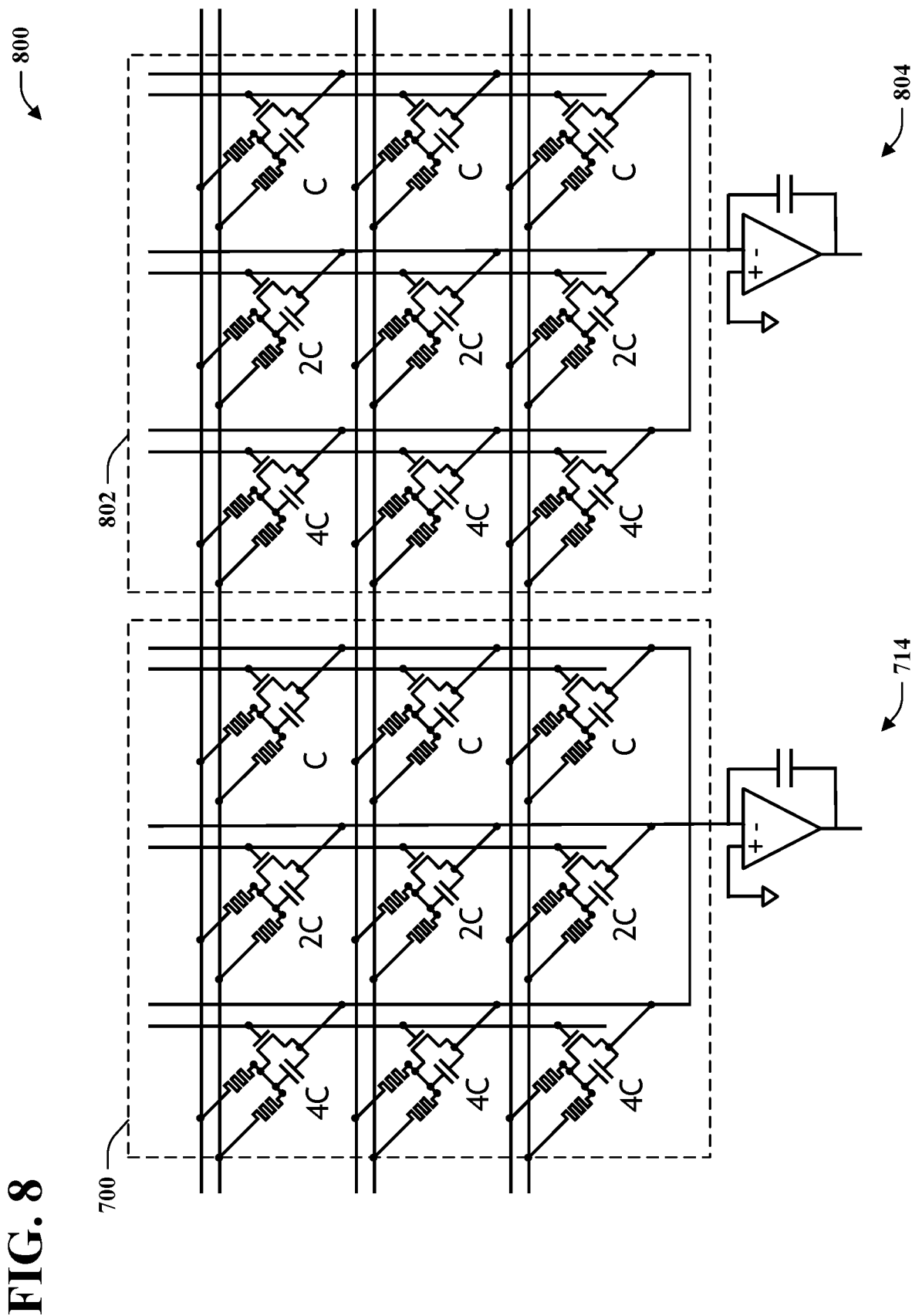
FIG. 8 is a schematic of yet another exemplary array circuit for vector-matrix multiplication.

It is to be understood that while the array 700 is configured to perform multiplication of a 1×3 vector by a 3×1 matrix, an array of VMM elements with multi-bit states can represent a matrix of substantially any size. In a non-limiting example, the array 700 could be modified to represent a 3×2 matrix by extending the array 700. For instance, and referring now to FIG. 8, an exemplary array 800 is shown, wherein the array 800 includes the array 700 as a sub-array and a second sub-array 802 that is substantially identical to the array 700. The sub-arrays 700, 802 can be connected by way of their row terminals while retaining independent column terminals. Thus, each of the sub-arrays 700, 802 represents a respective 3×1 matrix that is a sub-matrix of a larger 3×2 matrix represented by the array 800 in its entirety. The array 800 is configured to multiply a 1×3 vector by a 3×2 matrix to yield a 1×2 result matrix. Accordingly, the array 800 includes the first integrator 714 that is connected to the column terminals of the first sub-array 700, and a second integrator 804 that is connected to the column terminals of the second sub-array 802.

Figure 9:
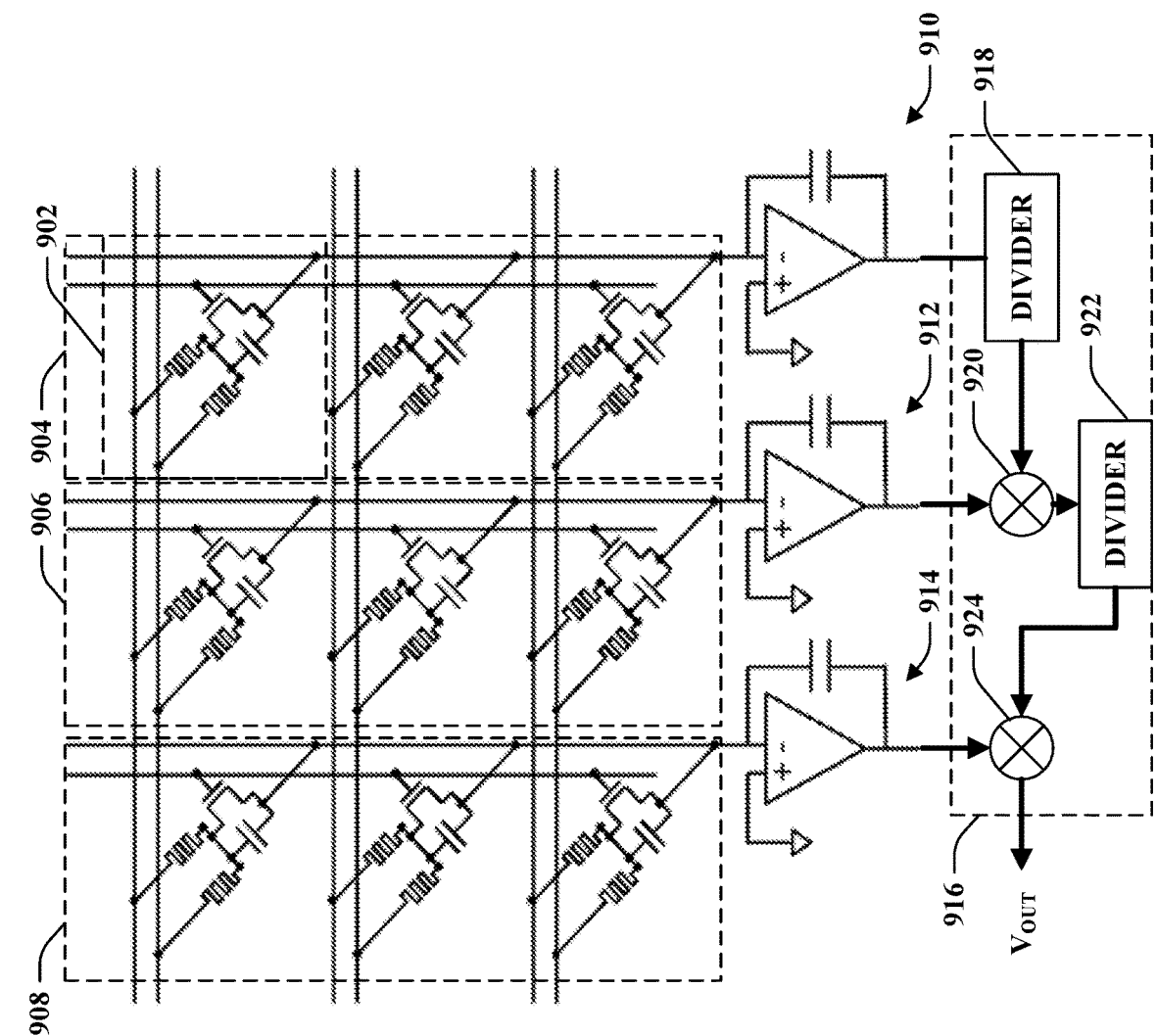
FIG. 9 is a schematic of still another exemplary array circuit for vector-matrix multiplication.

In other exemplary embodiments, multi-bit matrix elements can be represented using an array whose VMM elements have same capacitance values for their capacitors. Referring now to FIG. 9, an exemplary array 900 is shown wherein VMM elements (e.g., 902) of the array 900 have capacitors having a same capacitance as one another. The array 900 comprises three columns 904-908, wherein each of the columns is representative of a different bit position of a three-bit matrix element value. With greater specificity, the first column 904 represents a least-significant bit position, the second column 906 represents a next-least-significant bit position, and the third column 908 represents a further next least-significant bit position. Accordingly, the states of the VMM elements of the array 900 are representative of states of a 3×1 column matrix, and the array 900 is configured to multiply that matrix by a 1×3 input vector (e.g., as input at the row input lines of the array 900). In the array 900, each of the columns 904-908 has its own integrator, 910-914, respectively.

Multi-bit matrix element values are represented by scaling outputs of the integrators 910-914 according to the bit positions of the columns 904-908. For example, for a binary number, a value of a least significant bit is half of a value of a next more significant bit. Therefore, the array 900 can include a scaling circuit 916 that is configured to scale the outputs of the integrators 910-914 according to the represented bit positions of their respective columns 904-908. In a non-limiting example, the scaling circuit 916 can include a divider circuit 918 that is configured to receive the output of the integrator 910 and divide it by 2. The scaling circuit 916 can further include a summing circuit 920 that is configured to receive the output of the divider 918 and the output of the integrator 912 and to output a sum of the two. The output of the summing circuit 920 can then itself be provided to a divider circuit 922 that is configured to divide that sum by 2. The output of the divider circuit 922 is received by a summing circuit 924, which also receives the output of the integrator 914. The output $V_{OUT}$ of the summing circuit 924 is the sum of the output of the integrator 914 and the output of the divider circuit 922. The scaling circuit 916 functions to scale the output of each of the integrators 910-914 to a common base significance value, such that the output $V_{OUT}$ is a voltage representative of an element of a result matrix, which matrix is the result of multiplying the input matrix by the state matrix stored by the VMM elements.

Figure 10:
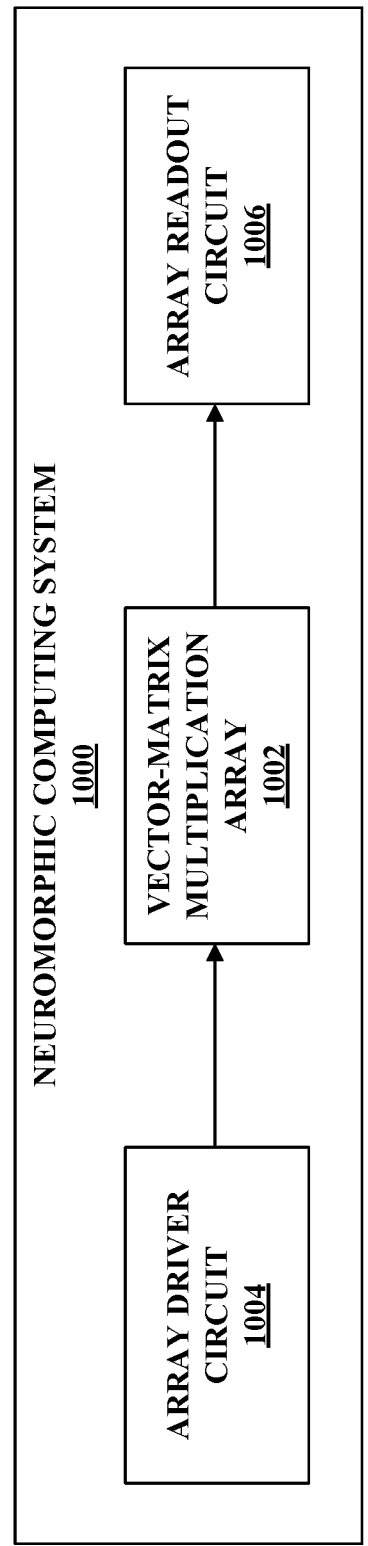
FIG. 10 is a functional block diagram of an exemplary neuromorphic computing system that includes a VMM array.

Any of the various vector-matrix multiplication arrays described herein can be employed in connection with performing vector-matrix multiplication operations that find application in certain neuromorphic computing architectures. Referring now to FIG. 10, an exemplary neuromorphic computing system 1000 that incorporates a vector-matrix multiplication array 1002 is illustrated. The array 1002 can be constructed similarly to any of the exemplary arrays 100, 700, 800, 900 described herein. It is to be understood that principles described herein with respect to the arrays 100, 700, 800, 900 are applicable to arrays of substantially any size, and accordingly the array 1002 can be composed of substantially any number of VMM elements. Further, it is to be understood that not every element included in the array 1002 must be employed for each operation of the array 1002. For example, the array 1002 can be a 1000×1000 element array that is used to represent states of a 500×500 matrix (with, for example, 500 inputs). In such a configuration, remaining VMM elements of the array 1002 can be disabled (e.g., by setting the states of their NVM elements to high resistance). The neuromorphic computing system 1000 further includes an array driver circuit 1004. The array driver circuit 1004 can be configured to program states of VMM elements of the array 1002 and/or to provide input voltages to row inputs of the array 1002 (e.g., inputs representative of elements of a vector that is desirably multiplied by the matrix represented by a state of the array 1002). The neuromorphic computing system 1000 can further comprise an array readout circuit 1006. The readout circuit 1006 can be configured to capture and hold values output by the VMM array 1002 for later use by the neuromorphic computing system 1000. In exemplary embodiments, the neuromorphic computing system 1000 can be configured to employ the array 1002 to compute an output matrix that is the result of propagation of an input vector through a layer of artificial neurons that apply weights (e.g., represented by a matrix) to the values of the input vector.

Figure 11:
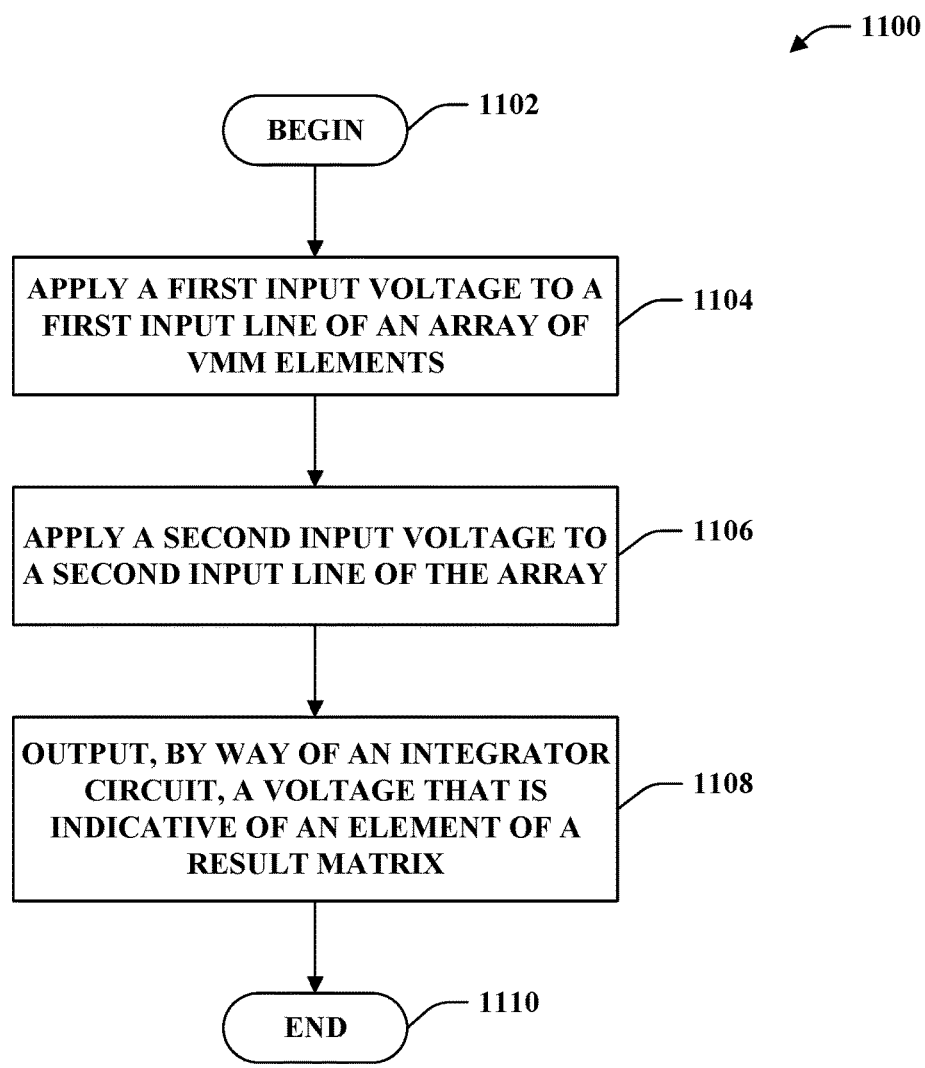
FIG. 11 is a flow diagram that illustrates an exemplary methodology for operating a VMM array.

FIG. 11 illustrates an exemplary methodology relating to computation of vector-matrix products by way of an array of VMM elements. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, in some instances the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 11, a methodology 1100 that facilitates performing multiplication of an input vector and an input matrix by way of an array of VMM elements is illustrated. The methodology 1100 begins at 1102, and at 1104, a first input voltage is applied to a first input line of an array of VMM elements. In exemplary embodiments, the array of VMM elements can be substantially similar to any of the arrays 100, 700, 800, 900 described above. The first input voltage can be indicative of a first element of the input vector. The first input line can be connected to a first VMM element in the array of VMM elements. At 1106, a second input voltage is applied to a second input line of the array of VMM elements, wherein the second input voltage is indicative of a second element of the input vector. The second input line can be connected to a second VMM element in the array of VMM elements. At 1108, a voltage that is indicative of an element of a result matrix, which matrix is the result of multiplication of the input vector and the input matrix, is output by way of an integrator circuit. The integrator circuit can be connected to the first and second VMM elements, such that the integrator output voltage is indicative of a cumulative charge drawn by the first and second VMM elements to charge capacitors of the first and second VMM elements. The charging of the capacitors of the first and second VMM elements is itself based upon application the first input voltage and the second input voltage, as described above with respect to the arrays 100, 700, 800, 900. At 1110, the methodology 1100 completes.

Some or all of the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a vector-matrix multiplication (VMM) element comprising:
        a capacitor connected to a first node and a second node; and
        a non-volatile memory (NVM) element connected to the first node and a third node, wherein an electrical characteristic of the NVM element is indicative of a value of an element of an input matrix; and
    an integrator circuit connected to the second node, wherein responsive to a voltage being applied to the third node, the capacitor charges, wherein further an output of the integrator circuit is based upon the charging of the capacitor, wherein the output of the integrator circuit is indicative of a matrix multiplication result.

2. The system of claim 1, wherein the electrical characteristic is a resistance of the NVM element.

3. The system of claim 1, wherein the VMM element further comprises a transistor, wherein one of a source or a drain of the transistor is connected to the first node and the other of the source or the drain is connected to the second node, and wherein responsive to a voltage being applied to a gate of the transistor, the voltage applied to the third node causes a value of the electrical characteristic of the NVM element to change.

4. The system of claim 1, wherein the VMM further comprises a second NVM element connected to the first node and a fourth node, wherein the voltage applied to the third node and a voltage applied to the fourth node are representative of a value of an element of a vector, wherein the matrix multiplication result is based upon the value of the element of the vector and the value of the element of the input matrix.

5. The system of claim 1, further comprising an array of VMM elements, the VMM element being included in the array of VMM elements, wherein the VMM elements are indicative of elements of the input matrix, and wherein the array is configured to receive input values indicative of elements of an input vector and to output values indicative of elements of a result matrix, the result matrix being a result of multiplication of the input vector and the input matrix.

6. The system of claim 5, wherein each of the VMM elements has a respective capacitor, and wherein capacitances of the capacitors of the VMM elements are substantially the same.

7. The system of claim 5, wherein the capacitance of the capacitor of the VMM element is based upon a position of the VMM element in the array of VMM elements.

8. A method, comprising:
    applying a first input voltage to a first input line of an array of vector-matrix multiplication (VMM) elements, the first input line connected to a first VMM element in the array, the first input voltage being indicative of a first element of an input vector;
    applying a second input voltage to a second input line of an array, the second input line connected to a second VMM element in the array, the second input voltage being indicative of a second element of the input vector; and
    outputting an output voltage by way of an integrator circuit, the integrator circuit connected to an output line that is connected to the first VMM element and the second VMM element, the output voltage based upon the first input voltage being applied to the first input line, the second input voltage being applied to the second input line, a first state of the first VMM element, and a second state of the second VMM element, the output voltage indicative of an element of a result matrix.

9. The method of claim 8, wherein the first input voltage and the second input voltage are analog values.

10. The method of claim 8, wherein the first state is representative of a binary value of an element of an input matrix, the result matrix being a result of multiplication of the input vector and the input matrix.

11. A system comprising:
    an array of vector-matrix multiplication (VMM) elements, each of the elements having a respective state, wherein states of the VMM elements are representative of elements of an input matrix;
    a plurality of input lines, wherein voltages applied to the input lines are representative of elements of an input vector;
    a plurality of output lines, each of the output lines connected to a respective column of the VMM elements; and
    a plurality of integrator circuits, each of the integrator circuits connected to a respective output line in the plurality of output lines, and wherein voltages output by the integrator circuits are representative of elements of a result matrix, wherein the result matrix is a result of multiplication of the input vector and the input matrix.

12. The system of claim 11, wherein each of the VMM elements comprises a non-volatile memory (NVM) element, wherein the state of the VMM is based upon an electrical characteristic of the NVM element.

13. The system of claim 12, wherein the NVM elements are ReRAM elements.

14. The system of claim 12, wherein the NVM elements are spin-transfer torque magnetic RAM (STT-MRAM) elements.

15. The system of claim 12, wherein the NVM elements are phase change memory (PCM) elements.

16. The system of claim 12, wherein the NVM elements are programmable-metallization cell (PMC) devices.

17. The system of claim 11, wherein the array comprises a first VMM element that is connected to a first input line in the input lines and a first output line in the output lines, the first VMM element includes a capacitor, wherein charging of the capacitor is based upon a first voltage applied to the first input line and a first state of the first VMM element, wherein an electrical signal at the first output line is based upon charging of the capacitor.

18. The system of claim 11, wherein the VMM elements are arranged in a plurality of rows and a plurality of columns, wherein a first row of VMM elements are connected to a same first input line, and wherein a first column of VMM elements are connected to a same first output line.

19. The system of claim 18, wherein the first column of VMM elements are further connected to a same second input line, wherein a voltage being applied to the second input line enables states of the first column of VMM elements to be modified.

20. The system of claim 11, wherein the array comprises a first VMM element, the first VMM element comprising:
a capacitor connected to a first node and a second node;
a non-volatile memory (NVM) element connected to the first node and a third node, wherein an electrical characteristic of the NVM element is indicative of a state of the first VMM element; and
an integrator circuit connected to the second node and a first output line in the output lines, wherein responsive to a voltage being applied to the third node, the capacitor charges, wherein further an output of the integrator circuit at the first output line is based upon the charging of the capacitor, wherein the output of the integrator circuit is indicative of a first element of the result matrix.

* * * * *